March 27, 1951      M. NIX      2,546,559
FISHING REEL
Filed April 15, 1947
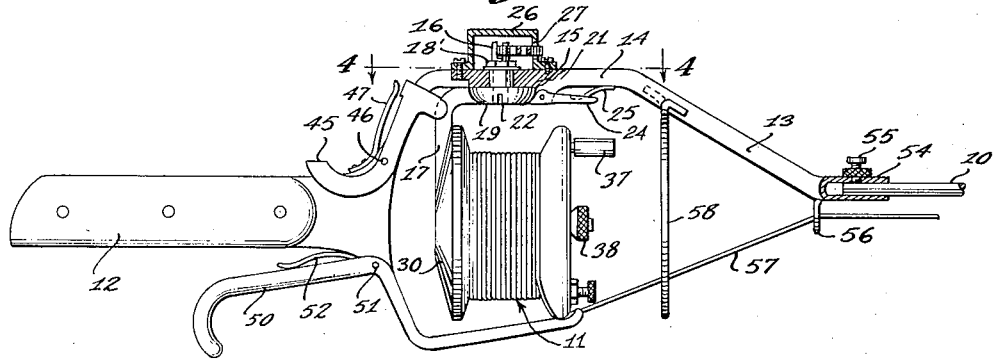
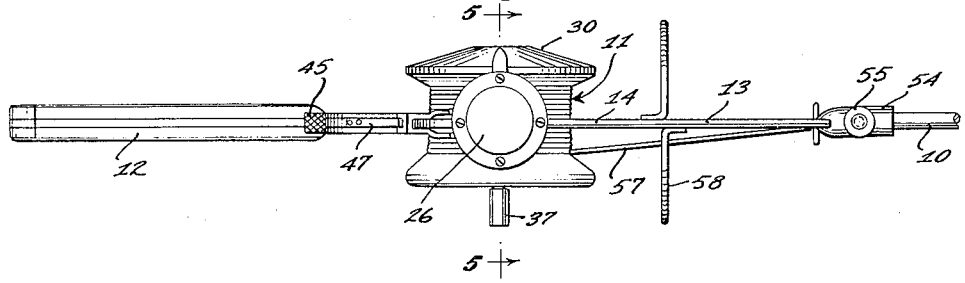
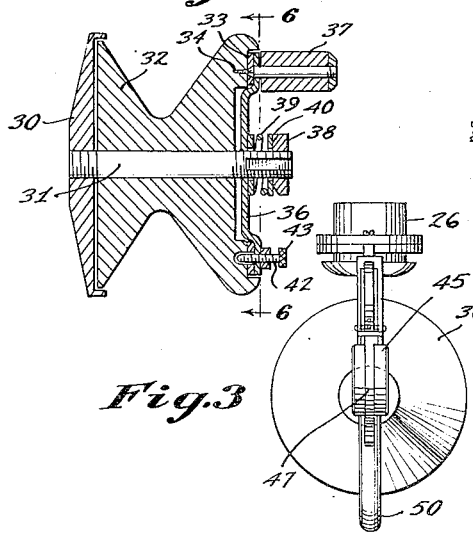
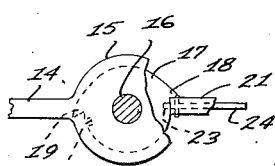
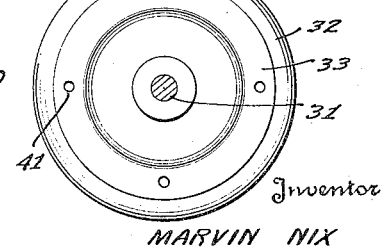
Inventor
MARVIN NIX
By McMorrow, Berman + Davidson
Attorneys Patented Mar. 27, 1951

2,546,559

UNITED STATES PATENT OFFICE 2,546,559

FISHING REEL

Marvin Nix, Muroc, Calif.

Application April 15, 1947, Serial No. 741,488

1 Claim. (Cl. 242—84.5)

This invention relates to fishing apparatus, and more particularly to a new and improved fishing reel.

An object of the present invention is to provide a fishing reel having a friction disc clutch means for controlling the rotative movement of the reel.

Another object of the present invention is to provide a fishing reel wherein the friction disc clutch means may be operated by a handle.

Further objects will appear to those skilled in the art from a reading of the following specification.

The accompanying drawings illustrate a preferred embodiment of the invention, but it is understood that modifications may be made therein without departing from the spirit of the invention as hereinafter claimed.

Figure 1 is an elevation of the new and improved fishing apparatus, portions thereof being shown in section, with the reel in casting position.

Figure 2 is a plan view, with the reel in position after the cast has been completed.

Figure 3 is an end view of the device, taken from the left of Figure 1.

Figure 4 is a section, partially broken away, taken on line 4—4 of Figure 1.

Figure 5 is a vertical section, taken along the line 5—5 of Figure 2.

Figure 6 is a vertical section, taken along the line 6—6 of Figure 5.

The fishing apparatus comprises a fishing rod or pole 10, a reel 11, and a handle 12. The pole 10 and the handle 12 are connected by a rigid frame member 13. The frame 13 has a straight portion 14 from which the reel 11 is supported, in a manner to be described more particularly hereinafter. The portion 14 includes a circular enlargement 15, which has a central aperture adapted to receive a shaft 16. The shaft 16 has a loose fit in the aperture and is freely rotatable therein. A mount 17, on which the reel 11 is supported, is secured to the under side of the shaft 16 to rotate therewith. A nut 18' retains the shaft 16 in position and permits the shaft 16 to rotate relative to the frame 13.

The reel mount 17 is provided with two radial stops 18 and 19, and in the travel of the mount 17 about the shaft 16 these stops 18 and 19 are limited in their movement by a projection 21 on the under side of the frame portion 14, as shown more particularly in Figure 4. The mount 17 is further provided with two slots 22 and 23, that are adapted to cooperate with a lever 24 movable in the projection 21 and thereby secure the mount 17 in position. The lever 24 is biased to locking position by a spring 25 fixed to the under side of the frame portion 14.

Secured to the top of the frame portion 14 by set screws or otherwise is a flat cover 26. The top of the shaft 16 is contained within the cover 26, and the top of the shaft 16 is slotted to receive a flat circular spring 27, the end of the spring 27 being anchored in the cover 26. The spring 27 is biased to turn the shaft 16 for the purpose of normally urging the reel 11 into a position where its axis is perpendicular to the fishing pole 10.

The reel, shown generally by the reference character 11, comprises a back 30 that is fixed to the mount 17. A shaft 31 has one end rigidly secured in the back 30, and on the shaft a bobbin 32 is mounted for free rotation thereon. An annular friction ring 33 is fixed to the front of the bobbin 32 by means of screws 34, only one of which is shown in Figure 5. These screws 34 have been omitted from Figure 6 for the sake of clarity. A clutch disc 36, also freely rotatable on the shaft 31, is adapted to bear against the face of the friction ring 33, and a turning handle 37 is fixed to the friction clutch disc 36. An adjusting nut 38 is fixed on the shaft 31, and contains a spring 39 that urges the friction clutch disc 36 against the friction ring 33. A washer 40 may be positioned between the adjusting nut 38 and the spring 39. The friction ring 33 and the bobbin 32 are provided with a plurality of orifices 41, which are adapted to receive a set screw 42 mounted on the rim of the clutch disc 36. Thus, whenever it is desired to lock the clutch disc 36 to the bobbin 32, the screw 42 is inserted into any one of the orifices 41, the position of the screw 42 in the orifice 41 being determined by a knurled nut 43. It will be apparent, therefore, that the frictional slip between the handle 37 and the bobbin 32 may be determined by adjusting the adjusting nut 38, and that the handle 37 may be fixed to the bobbin 32 by means of the screw 42.

A lever 45 is provided for the purpose of retaining the mount 17 in the position shown in Figure 1. The lever is pivoted on a horizontal pivot 46 on the frame 13, and the upper portion of the lever 45 is bifurcated to embrace the mount 17. A spring 47 is anchored on the frame 13 and bears against the upper portion of the lever 45 to retain the mount 17, as indicated. When the other end of the lever 45 is depressed, the spring 27 will turn the shaft 16 and the reel mount 17 to the position shown in Figure 2, as hereinbefore mentioned.

A snubbing lever 50 is adapted to bear against the line on the bobbin 32 when the latter is in the position shown in Figure 1. For this purpose, the lever 50 is pivoted on a horizontal pivot 51 on the frame 13, and is spring pressed by a spring 52 to snubbing position.

The fishing pole is held in the frame 13 by means of a clamp 54 and nut 55. Adjacent the clamp 54 is a guide 56 for guiding the line 57 as the latter is wound on or unwound from the bobbin 32. An additional guide 58 may be provided, taking the form of a circle of substantially the same diameter as the bobbin 32, the ends thereof being embedded or otherwise fixed to the frame 13.

The cast is commenced while the reel 11 is in the position shown in Figure 1. The bobbin 32 will not rotate, and the inertia forces previously mentioned will not be effective. When the line 57 and its attached weight have stopped moving, the fisherman will depress the lever 45, and the spring 27 will swing the reel mount 17 and the reel 11 90° about the axis of the shaft 16, to the position shown in Figure 2. In this position, the lever 24 will engage the slot 23 for right-hand rotation of the mount 17, as referred to in Figure 1, and the slot 22 for left-hand rotation, thereby locking the mount 17 under the urging of the spring 25.

I claim:

In a fishing reel, a relatively stationary support having a plane face, a stationary shaft projecting at right angles from said face and having a free end, a reel body journalled on said shaft having an inner end engageable with said plane face and an outer end spaced from the free end of the shaft, the outer end of said reel body being formed with a concentric circular recess defining an annular axially outset projection having a friction facing, a friction disc journalled on said shaft between the outer end of the reel body and the free end of said shaft, said friction disc having an axially inset circular central portion defining an axially outset annular peripheral portion arranged to engage said friction facing with said inset central portion extending into said recess, a handle on said peripheral annular portion of the disc, and spring means acting between the free end of the shaft and the outer side of the friction disc and urging said disc toward the outer end of the reel body.

MARVIN NIX.

REFERENCES CITED

The following references are of record in the file of this patent:

UNITED STATES PATENTS

| Number | Name | Date |
|---|---|---|
| 396,956 | Prouty | Jan. 29, 1889 |
| 744,454 | Allen | Nov. 17, 1903 |
| 1,007,443 | Hall | Oct. 31, 1911 |
| 1,077,461 | Dutcher | Nov. 4, 1913 |
| 1,114,084 | Wells | Oct. 20, 1914 |
| 1,621,003 | Dodd | Mar. 15, 1927 |
| 2,126,227 | Stanley | Aug. 9, 1938 |
| 2,203,453 | Bond | June 4, 1940 |

FOREIGN PATENTS

| Number | Country | Date |
|---|---|---|
| 16,938 of 1903 | Great Britain | June 16, 1904 |
| 211,406 | Great Britain | Feb. 21, 1924 |
| 389,694 | Great Britain | Mar. 23, 1933 |
| 813,087 | France | Feb. 15, 1937 |